(12) United States Patent
Kucherov et al.

(10) Patent No.: US 8,695,476 B2
(45) Date of Patent: Apr. 15, 2014

(54) ARMOR PLATE WITH SHOCK WAVE ABSORBING PROPERTIES

(75) Inventors: Yan R. Kucherov, Alexandria, VA (US); Graham K. Hubler, Highland, MD (US); Brant G. Johnson, Annapolis, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 226 days.

(21) Appl. No.: 13/047,288

(22) Filed: Mar. 14, 2011

(65) Prior Publication Data

US 2012/0234164 A1 Sep. 20, 2012

(51) Int. Cl.
F41H 5/04 (2006.01)
(52) U.S. Cl.
USPC ............... 89/36.02; 89/905; 89/906; 428/911
(58) Field of Classification Search
USPC ......... 89/36.01–36.07, 36.11–36.16; 428/911
See application file for complete search history.

(56) References Cited

U.S. PATENT DOCUMENTS

| | | | |
|---|---|---|---|
| 2,562,467 | A | 7/1951 | Kinnear, Jr. |
| 3,577,836 | A | 5/1971 | Tamura |
| 3,633,520 | A | 1/1972 | Stiglich, Jr. |
| 3,634,177 | A | 1/1972 | Glaser |
| 3,666,614 | A | 5/1972 | Snedeker et al. |
| 3,829,899 | A | 8/1974 | Davis |
| 3,863,541 | A | 2/1975 | Cline et al. |
| 4,201,828 | A | 5/1980 | Triebel et al. |
| 4,663,228 | A | 5/1987 | Bolton et al. |
| 4,836,084 | A | 6/1989 | Vogelesang et al. |
| 5,059,467 | A | 10/1991 | Berkovitz |
| 5,060,553 | A | 10/1991 | Jones |
| 5,087,516 | A | 2/1992 | Groves |
| 5,110,661 | A | 5/1992 | Groves |
| H1061 | H | 6/1992 | Rozner et al. |
| 5,179,244 | A | 1/1993 | Zufle |
| 5,180,880 | A | 1/1993 | Zufle |
| 5,326,606 | A | 7/1994 | Labock |
| 5,349,893 | A | 9/1994 | Dunn |
| 5,364,679 | A | 11/1994 | Groves |

(Continued)

FOREIGN PATENT DOCUMENTS

| | | |
|---|---|---|
| DE | 44 13 969 | 10/1995 |
| DE | 103 23 082 | 12/2004 |

(Continued)

OTHER PUBLICATIONS

Parimal J. Patel et al., *Transparent Armor*, AMPTIAC Newsletter, Fall 2000, vol. 4, No. 3, pp. 1-5.

(Continued)

*Primary Examiner* — Daniel J Troy
(74) *Attorney, Agent, or Firm* — US Naval Research Laboratory; Stephen T. Hunnius (57) ABSTRACT

A composite armor plate includes a fracture layer placed adjacent to a ceramic layer. The ceramic layer provides a ballistic resistant layer that receives a ballistic impact and propagates a compression wave. The fracture layer is placed behind the ceramic layer and absorbs a portion of the compression wave propagating out in front of the ballistic impact. The absorbed compression wave causes the fracture layer to at least partially disintegrate into fine particles, which dissipates energy in the process. To cause a higher degree of fracturing (and thus larger dissipation of compression wave energy) the fracture layer includes a plurality of resonators embedded in a fracture material.

22 Claims, 7 Drawing Sheets

(56) References Cited

U.S. PATENT DOCUMENTS

| | | |
|---|---|---|
| H1519 H | 3/1996 | Semple |
| H1567 H | 8/1996 | Parsons et al. |
| 5,622,776 A | 4/1997 | Esu |
| 5,692,384 A | 12/1997 | Layton |
| 5,900,097 A | 5/1999 | Brown |
| 6,112,635 A | 9/2000 | Cohen |
| 6,189,327 B1 | 2/2001 | Strauss et al. |
| 6,203,908 B1 | 3/2001 | Cohen |
| 6,253,655 B1 | 7/2001 | Lyons et al. |
| 6,418,832 B1 | 7/2002 | Colvin |
| 6,537,654 B1 | 3/2003 | Gruber et al. |
| 6,635,357 B2 | 10/2003 | Moxson et al. |
| 6,698,331 B1 | 3/2004 | Yu et al. |
| 6,912,944 B2 | 7/2005 | Lucuta et al. |
| 7,104,177 B1 | 9/2006 | Aghajanian et al. |
| 7,332,221 B2 | 2/2008 | Aghajanian et al. |
| 7,459,105 B2 | 12/2008 | Chandran |
| 7,584,689 B2 | 9/2009 | Jones et al. |
| 7,793,580 B2 | 9/2010 | Jones et al. |
| 2004/0161989 A1 | 8/2004 | Dennis et al. |
| 2005/0172792 A1 | 8/2005 | Wolf et al. |
| 2006/0060077 A1 | 3/2006 | Lucuta et al. |
| 2006/0253950 A1 | 11/2006 | Kerr |
| 2007/0068375 A1 | 3/2007 | Jones et al. |
| 2007/0068376 A1 | 3/2007 | Jones et al. |
| 2007/0283801 A1 | 12/2007 | Gallo |
| 2008/0011153 A1 | 1/2008 | MacDonald |
| 2008/0092729 A1 | 4/2008 | Cook |
| 2008/0104735 A1 | 5/2008 | Howland |
| 2008/0187721 A1 | 8/2008 | Engl |
| 2008/0264243 A1 | 10/2008 | Lucuta et al. |
| 2008/0318080 A1 | 12/2008 | Branagan |
| 2009/0108507 A1 | 4/2009 | Messing et al. |
| 2009/0136702 A1 | 5/2009 | Gu |
| 2009/0217813 A1 | 9/2009 | Carberry et al. |
| 2009/0308239 A1 | 12/2009 | Jones et al. |
| 2010/0288117 A1 | 11/2010 | Jones et al. |

FOREIGN PATENT DOCUMENTS

| | | |
|---|---|---|
| DE | 10 2007 025 894 | 12/2008 |
| EP | 0 731 332 | 9/1996 |
| EP | 1 898 174 | 3/2008 |
| FR | 2 798 189 | 3/2001 |
| RU | 2359832 C1 | 6/2009 |
| WO | WO2006/135832 A2 | 12/2006 |
| WO | WO2008/130457 A2 | 10/2008 |
| WO | WO2008/150355 A1 | 12/2008 |
| WO | WO2009/042877 A2 | 4/2009 |
| WO | WO2009/096930 A1 | 8/2009 |

OTHER PUBLICATIONS

C.G. Fountzoulas et al., *A computational Study of Laminate Transparent Armor Impacted by FSP*, Army Research Laboratory, Jun. 2009, 14 pages.
Parimal J. Patel et al., *Improved Low-Cost Multi-Hit Transparent Armor*.
Koizumui et al., *Lattice Wave Emission from a Moving Dislocation*, Phys. Rev. B, 65, 214104, 2002.
Nadgornyi, E., Dislocation Dynamics and Mechanical Properties of Crystals, Progress in Materials Science, V. 31, Pergamon Press, 1988, pp. iv-180.
Nadgornyi, E., Dislocation Dynamics and Mechanical Properties of Crystals, Progress in Materials Science, V. 31, Pergamon Press, 1988, pp. 181-360.
Nadgornyi, E., Dislocation Dynamics and Mechanical Properties of Crystals, Progress in Materials Science, V. 31, Pergamon Press, 1988, pp. 361-536.
V.A. Al'shitz and V.L. Indenbom, Dynamic Dragging of Dislocations, Sov. Physics-Usp., V. 18, No. 1, pp. 1-20, 1975.
A.A. Maradudin et al, Lattice Dynamics, Benjamin, NY, 1969, pp. 332-380.
D. Heiman et al., *Brillouin Scattering Measurements on Optical Glasses*, Physical Review B., vol. 19, No. 17, Jun. 15, 1979, pp. 6583-6592.
International Search Report and Written Opinion dated Nov. 25, 2011 issued in PCT/US2011/024579.
Office Action dated Aug. 16, 2011, issued in U.S. Appl. No. 12/708,991, filed Feb. 19, 2010.
International Search Report and Written Opinion for PCT/US2010/028908 issued Jul. 22, 2010.
Office Action issued Feb. 15, 2011 in U.S. Appl. No. 12/291,063, filed Apr. 10, 2009.
Final Office Action issued Aug. 8, 2011 in U.S. Appl. No. 12/291,063, filed Apr. 10, 2009.

ARMOR PLATE WITH SHOCK WAVE ABSORBING PROPERTIES

GOVERNMENT LICENSE RIGHTS

The U.S. Government has a paid-up license in this invention and the right in limited circumstances to require the patent owner to license others on reasonable terms as provided for by the terms of contract No. N00173-07-C-2055 awarded by U.S. Naval Research Laboratory.

BACKGROUND OF THE INVENTION

1. The Field of the Invention

The present invention relates to armor plates and articles of manufacture incorporating the armor plates.

2. The Relevant Technology

Armor is a material or system of materials designed to protect from ballistic threats. Transparent armor, in addition to providing protection from the ballistic threat is also designed to be optically transparent, which allows a person to see through the armor and/or to allow light to illuminate the area behind the armor.

In the general field of ballistic armors, existing armor systems are typically comprised of many layers of projectile resistant material separated by polymer interlayers, which bond the projectile resistant materials. In a typical armor laminate the strike surface is a hard layer of projectile resistant material that is designed to break up or deform projectiles upon impact. The interlayer materials are used to mitigate the stresses from thermal expansion mismatches as well as to stop crack propagation into the polymers.

For most armor plates, efforts are usually made to make the armor plate light weight. This is particularly true of transparent armor plates, which are often used for protective visors and goggles. Currently existing military specification for protective visors and goggles requires that the lens should be able to stop 0.22-caliber 17 grain FSP projectile at 550-feet per second (fps). For comparison, most handguns give more than 1000 fps bullet velocity and rifles up to 3000 fps. To stop bullets from handguns one needs an inch thick polycarbonate plate and around two inches thickness for a rifle bullet.

Accordingly, what is needed in the art are armor plates that have improved resistance to a projectile for a given weight and/or thickness.

DETAILED DESCRIPTION

The present invention relates to a composite armor plates and articles of manufacture incorporating the armor plate. The composite armor plate includes a strike face layer adjacent a fracture layer, which is also placed adjacent a ceramic layer. The ceramic layer provides a ballistic resistant layer that receives a ballistic impact and propagates a compression wave accumulated in the strike layer. The ceramic layer provides toughness that impedes the projectile and may accelerate and spread out the compression wave. The fracture layer is placed behind the ceramic layer and absorbs a portion of the compression wave propagating out in front of the projectile mostly by the failure wave mechanism. The absorbed compression wave causes the fracture layer to at least partially disintegrate into fine particles, which absorbs energy in the process.

To cause a higher degree of fracturing (and thus larger absorption of compression wave energy) the fracture layer includes a plurality of resonators embedded in a fracture material which work as seeds for the failure wave. The resonators can be repeating thin layers of a resonator material (i.e., alternating layers of fracture material and thin sheets of resonator material). Or alternatively, the resonators can be particles dispersed in the fracture material. The resonators have a size and composition that reflects and stores wave energy (i.e., acoustic phonons) generated in the fracture layer.

The composition of the fracture material is selected to give high energy acoustic spectral line to intercept energy from a decomposing compressive wave. The principles of resonance are implemented to increase the life-time of the acoustic spectral line. The resonators are selected to have a thickness that is half the wavelength (λ) of the acoustic spectral line as measured using the sound velocity of the resonator material (described more fully below). Selecting a resonator thickness of λ/2 and using a resonator material that has mechanical properties different than the fracture material creates an interface capable of reflecting the phonons, which sustains the phonons (waves) for a longer period of time. By sustaining the waves for a longer period of time, the waves are able to fracture more of the fracture material, thereby dissipating more energy.

The intensity of the acoustic spectral line depends on the fracture material chosen. The acoustic spectral lines of the fracture material are a property of the material itself. The wavelength of the acoustic spectral lines is the same even if the compression wave changes so long as the compression wave has sufficient energy to activate vibrations at a particular acoustic spectral line wavelength. Since the acoustic spectral line emissions have a fixed wavelength in a given material (i.e., a fixed frequency), the resonators can be specifically designed to cause resonance in a particular fracture material.

Materials that can absorb a high energy shock wave and generate wave energy in an acoustic spectral line with a frequency suitable for enhancing fracturing include, but are not limited to amorphous materials such as glasses. Crystalline materials may be used so long as the material includes lattice asymmetries (i.e., materials other than cubic crystalline materials and/or monocrystalline materials) and the crystalline material has a tensile strength lower than the resonator. Examples include non-cubic crystalline materials such as, but not limited to titania, alumina, and magnesium oxide.

The use of resonators in the fracture layer can increase the ballistic resistance of the armor plate and/or allow reduced thicknesses of the fracture layer needed to achieve a desired ballistic resistance. Armor plates including a fracture layer with resonators can be made comparatively lighter, stronger, and/or thinner than armor materials using un-doped fracture layers and/or armor materials using conventional laminates.

In one embodiment, the armor plate can be transparent. Transparent armor plates can be incorporated into windows, helmets, goggles, and similar devices where transparency and/or translucency are desired. In other embodiments, the armor plate can include one or more layers that are opaque.

Optionally, the armor plates of the present invention can achieve an even lighter, thinner armor by placing a deformable layer on the front side of the ballistic-resistant ceramic layer. The use of a deformable layer in front of the strong ceramic layer causes the shock wave to spread out before it strikes the ceramic layer. When the large surface area shock wave strikes the fracture layer, the larger surface area results in comparatively larger area of the fracture layer being disintegrated, which dissipates a comparatively larger amount of energy. Depending on the plate geometry, projectile size and speed, orders of-magnitude increase in energy absorption can be achieved using a fracture layer with resonators either alone or in combination with a deformable layer in front of the ceramic layer.

Figure 1:
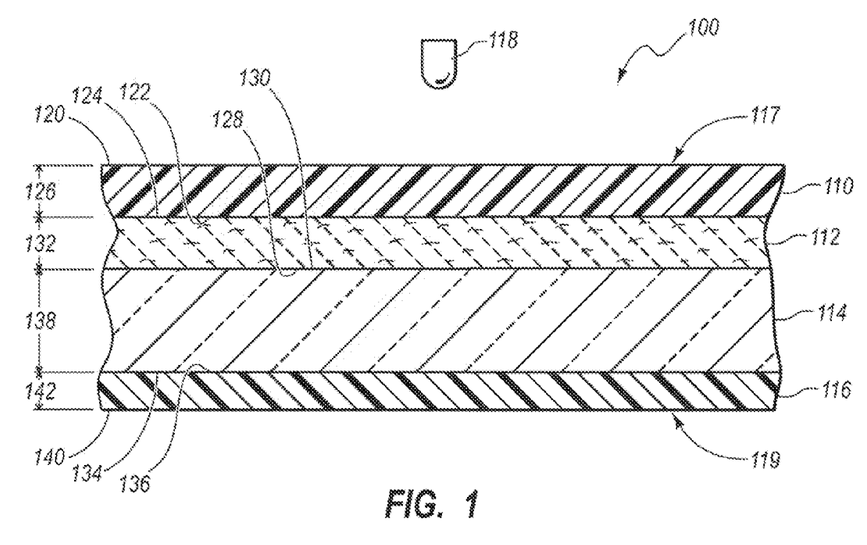
FIG. 1 illustrates an armor plate according to one embodiment of the invention and a projectile about to strike the surface of the armor plate.

FIG. 1 illustrates an example armor plate 100 according to one embodiment of the invention. The armor plate 100 includes an optional transparent deformable layer 110, a transparent ceramic layer 112, a fracture layer 114, and an optional spall liner 116. While armor plate 100 is described below as having a deformable layer 110 and a spall liner 116, those skilled in the art will recognize that the principles of the invention can be carried out without these layers and that the armor plate 100 can include any number of other layers so long as any shock wave of sufficient energy is transferred to the fracture layer and causes at least partial disintegration (i.e., powder formation) of the fracture material.

Armor plate 100 has a strike surface 117 upon which a projectile 118 impinges. Projectile 118 can be a bullet, shrapnel, debris or any other item or structure that could hit against armor plate 100. Armor plate 100 also includes a back surface 119 opposite the strike surface 117. Strike surface 117 is configured to receive the initial impact of projectile 118 and back surface 119 is configured to be the surface closest to the object for which the armor plate 100 provides protection. For example, where armor plate 100 is used as a window in an armored vehicle, strike surface 117 is positioned outside the vehicle and back surface 119 communicates with the interior of the vehicle.

In one embodiment, the optional deformable layer 110 has a first side 120 configured to be the strike surface 117 upon which projectile 118 impinges. Deformable layer 110 may be configured to generate a compression wave from the impact of projectile 118. In one embodiment deformable layer 110 comprises a material having an elongation before failure of at least 20%. Materials having an elongation before failure of at least 20% typically generate an intense compression wave upon ballistic impact. In a more preferred embodiment, the deformable layer may include a material having an elongation before failure of at least about 50%, even more preferably at least about 100% or more. Examples of suitable transparent materials that can be used for the deformable layer 110 include, but are not limited to, polycarbonate, polyurethanes, elastic acrylic polymers, and combinations of these. Examples of nontransparent deformable materials that can be used include aluminum, titanium, and combinations of these. Other materials can also be used.

If present, deformable layer 110 may include a backside 122 that opposes first side 120. Backside 122 is adjacent ceramic layer 112. As will be discussed below in greater detail, backside 122 may be adhered to or otherwise bonded directly to ceramic layer 112 or alternatively backside 122 may be held in direct contact with ceramic layer 112 without being bonded thereto, such as by mechanical connection. For example, deformable layer 110 and ceramic layer 112 can be adhered using a resin such as, but not limited to, poly(vinylbutiral) or secured together by fixing the layers within a frame and/or clamping.

The thickness of deformable layer 110 may be selected to enhance the generation of the compression wave. In one embodiment the deformable layer 110 has a thickness extending between faces 120 and 122 in a range from about 0.5 mm to about 10 mm, more preferably about 1 mm to about 4 mm. Opposing faces 120 and 122 can be disposed in parallel alignment so that the thickness is constant. Alternatively, one or both of the faces can be angled relative to each other so that the thickness varies between faces 120 and 122. Faces 120 and 122 can also be contoured, such as curved, so that they are not planar.

In one embodiment, deformable layer 110 is a single layer of a homogeneous material. However, in some embodiments the deformable layer 110 may be made from a plurality of sub-layers that together are highly deformable (e.g., the sub-layers together have an elongation before failure of at least about 20%).

Ceramic layer 112 is positioned adjacent to and between deformable layer 110 and fracture layer 114. Ceramic layer 112 has a front side surface 124 and an opposing backside surface 128. Backside surface 128 is adjacent fracture layer 114. Ceramic layer 112 can be adhered to or otherwise bonded or secured to fracture layer 114 using the same methods as previously discussed for securing ceramic layer 112 and deformable layer 110.

Ceramic layer 112 is made from a strong, ballistic-resistant ceramic material having a high sound velocity. The ceramic material will typically have a sound velocity in a range from about 2-19 km/s, more specifically 4-19 km/s, or even more specifically 8-19 km/s. Ceramic layer 112 may also be transparent. Examples of suitable transparent ceramic materials include sapphire, aluminum oxinitride (AlON), spinel, AlN, alumina, and combinations of these. Nontransparent ceramic materials can also be used. Examples of nontransparent ceramic materials include, but are not limited to, silicon carbide, boronitride, boron carbide, diamond, and combinations of these. These materials and similar materials with a high sound velocity are advantageous for allowing the compression wave generated in the deformable layer 110 to spread out as it travels through ceramic layer 112 and for providing toughness in a thin layer.

The thickness 132 of ceramic layer 112 extending between faces 124 and 128 is typically selected to provide maximum strength while minimizing weight. Ceramics such as sapphire, aluminum oxynitride (AlON), and spinels typically need to have a minimal thickness before they will outperform plastic materials (e.g., about 0.25 mm). After this minimal thickness, ceramics tend to provide better protection than plastics, but with increased weight, as the density of transparent ceramics are 2 to 3 times higher than the density of plastics. Thus, even where cost is not an issue, practical weight restrictions in some cases can limit the thickness of ceramic layer 112.

Even when relatively thick ceramic layers can be used, a thick ceramic layer tends to transfer impact velocity to the substrate (e.g., the frames of protective eyewear), which may not be able to handle increased forces and the whole system must be strengthened, again with weight increase. Thus in some embodiments of the invention it is desirable to minimize the thickness of the ceramic layer 112. In one embodiment, the thickness may be less than 10 mm, more preferably less than about 6 mm, even more preferably less than about 4 mm, and most preferably less than about 2 mm. In one embodiment the thickness 132 can be in a range from about 0.5 mm to about 6 mm, more preferably about 0.8 mm to about 4 mm, and most preferably from about 1 mm to about 2 mm.

In one embodiment of the invention ceramic layer 112 may be a continuous and/or homogeneous layer of the ceramic material. However in an alternative embodiment ceramic layer 112 may include a plurality of sub-layers of the ceramic material. The sub-layers may be the same or different ceramic materials and may be bonded or adhered together as discussed herein with respect to the connection between deformable layer 110 and ceramic layer 112.

Fracture layer 114 is adjacent to and between ceramic layer 112 and optional spall liner 116. Fracture layer 114 has a front side 130 and an opposing backside 134. Backside 134 may be adhered to or bonded to a front surface 136 of spall liner 116 in any manner similar to the connection between deformable layer 110 and ceramic layer 112 as discussed above.

Fracture layer 114 is configured to receive a compression wave from ceramic layer 112 and at least partially disintegrate. Fracture layer 114 includes a fracture material (e.g., glass or a brittle polymeric material) and a plurality of resonators (e.g., layers or particles of titania). The thickness of fracture layer 114 can be selected to provide adequate volume for absorbing a compression wave generated in deformable layer 110. The thickness 138 of fracture layer 114 extending between faces 130 and 134 can be in a range from about 0.5 mm to about 10 mm, more specifically about 1 mm to about 5 mm. It is appreciated that all of the thicknesses discussed herein can also be considered to be in terms of an average thickness, a maximum thickness, or a minimum thickness.

Fracture layer 114 is backed by spall liner 116 to stop (i.e. catch) the fractured particles of fractured layer 114. Spall liner 116 has a front surface 136 that is adjacent fracture layer 114. In one embodiment, a back surface 140 of spall liner 116 is configured to be the back surface 119 of armor plate 110.

When a projectile strikes armor plate 100 and fracture layer 114 is at least partially pulverized, the disintegrated particles will be small, but can still carry residual momentum. Spall liner 116 is made from a material capable of capturing the fine particles generated from fracture layer 114. In one embodiment spall liner 116 may have relatively high elasticity such that spall liner 116 can expand to absorb the momentum of the fractured particles without rupturing.

Examples of suitable materials that can be used to make spall liner 116 include polymers such as polycarbonate and polyurethane; woven ballistic fibers including para-aramids (e.g., Kevlar), ultra-high strength polyethylene fiber (e.g., Spectra and Dyneema), poly(p-phenylene-2,6-benzobisoxazole) (PBO), and/or boron fibers; and combinations of these. In one embodiment, spall liner 116 can be made from a transparent material such as polycarbonate or Dynema. Alternatively, spall liner 116 can be nontransparent.

The thickness of spall liner 116 is selected to ensure sufficient strength to withstand the residual momentum of the fractured particles from fracture layer 114. Typically the thickness of spall liner 116 may be in a range from about 0.5 mm to about 10 mm, more specifically between about 1 mm and 4 mm.

Figure 2:
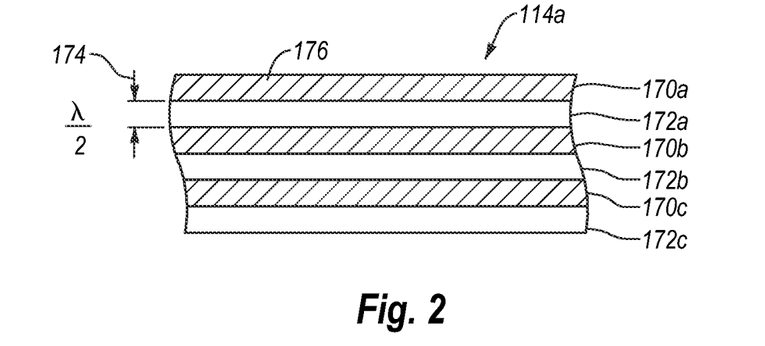
FIG. 2 illustrates a fracture layer of the armor plate shown in FIG. 1 having a plurality of resonator layers according to one embodiment of the invention.
Figure 3:
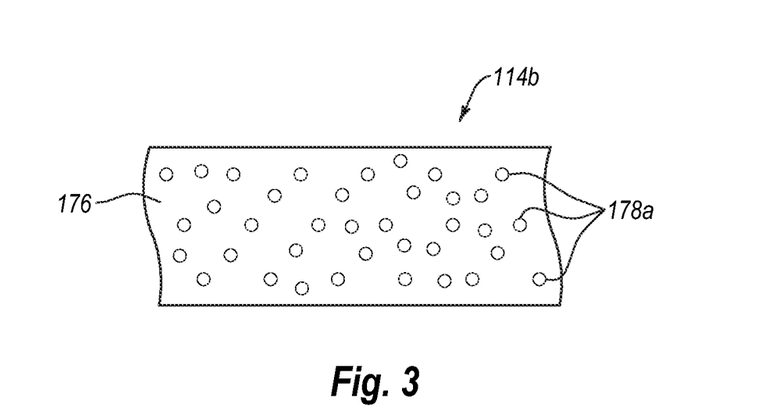
FIG. 3 illustrates a fracture layer of the armor plate shown in FIG. 1 having a plurality of spheroidal particulate resonators according to one embodiment of the invention.
Figure 4:
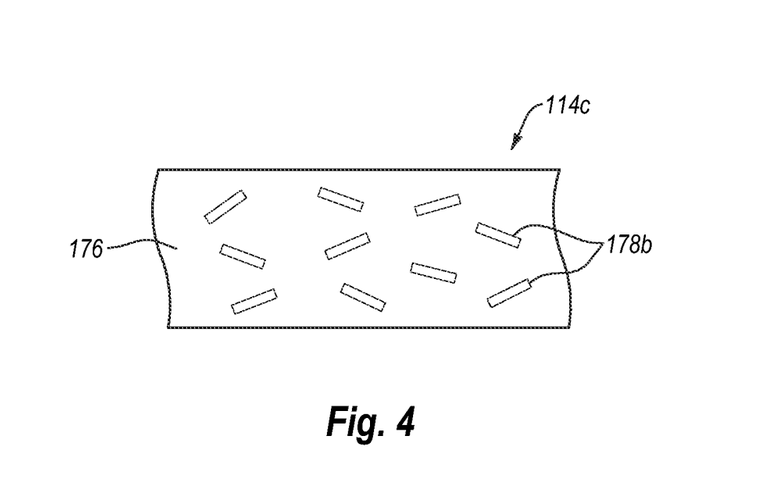
FIG. 4 illustrates a fracture layer of the armor plate shown in FIG. 1 having a plurality of non-spheroidal particulate resonators according to one embodiment of the invention.

With reference to FIGS. 2-4, the fracture layer 114 is described in further detail. FIGS. 2-4 illustrate various configurations of fracture material and resonators suitable for sustaining high energy waves. With reference to FIG. 2, a fracture layer 114a includes a plurality of fracture material layers 170a-170c (collectively "fracture material layers 170") that alternate between a plurality of resonator layers 172a-172c (collectively "resonator layers 172"). The fracture material layers 170 are comprised of a fracture material 176 that is configured to be pulverized upon ballistic impact.

FIGS. 3 and 4 illustrate alternative embodiments in which fracture layer 114 includes particulate resonators. FIG. 3 shows a fracture layer 114b that includes spheroidal particulate resonators 178a dispersed in fracture material 176. FIG. 4 illustrates a fracture layer 114c that includes fiber resonators 178b dispersed in fracture material 176.

Figure 5:
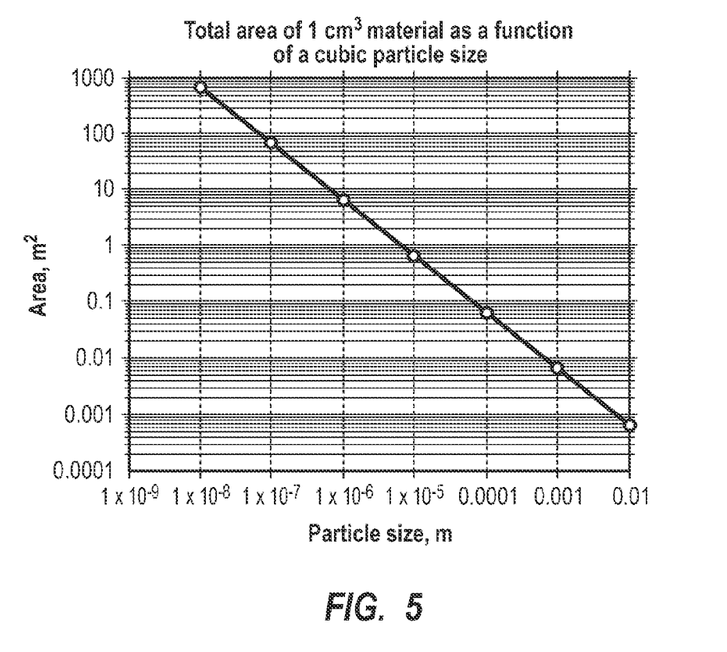
FIG. 5 is a graph showing the surface area of particles derived from 1 cm3 of material as a function of particle size.

In the embodiments shown in FIGS. 2-4, the resonators 178 are embedded in fracture material 176. Fracture material 176 is selected to have a lower impact resistance or tensile strength than the material of ceramic layer 112. To achieve high energy absorption by fracture layer 114, a relatively large volume of fracture material 176 is fractured into fine particles. The absorbed energy increases with a decrease in the diameter of the fractured particle size due to an increase in surface area. FIG. 5 is a graph showing the surface area of particles derived from 1 cm3 of material as a function of the particle size. As shown in FIG. 5, surface area increases exponential with decrease in particle size. Consequently the energy dissipated by fracture layer 114 increases exponentially with decreases in particle size.

Figure 6:
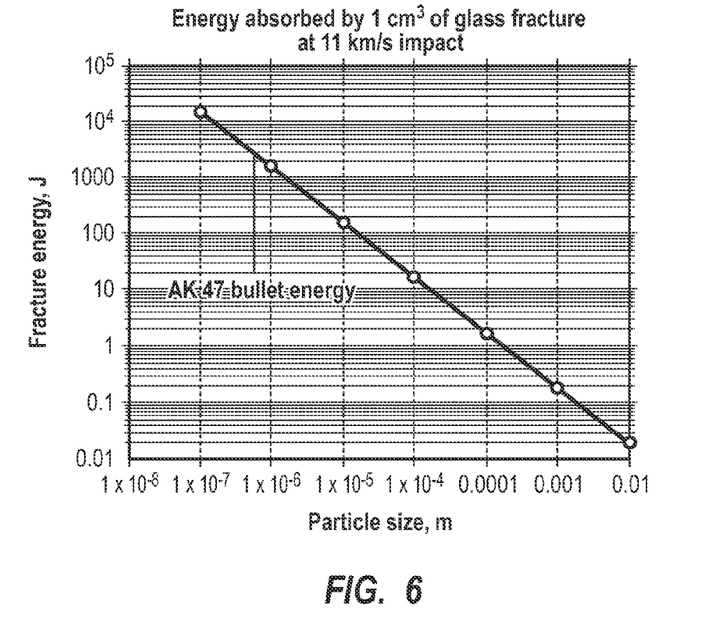
FIG. 6 is a graph showing fracture energy absorbed by 1 cm3 of glass fractured as a function of particle size at 11 km/s impact.

FIG. 6 shows the energy absorbed by 1 cm3 of glass fractured at 11 km/s impact. To illustrate the potential energy absorption of fractured glass, the energy of an AK-47 bullet is plotted on the graph of FIG. 6. As shown in FIG. 6, 1 cm3 of glass is, in principle, capable of absorbing all the energy from a rifle bullet if the fractured grain size is smaller than about 1×10−7. The armor plate 100 of the present invention provides for substantial energy absorption in fracture layer 114 by using resonators that sustain high energy waves capable of fracturing the fracture material to finer particle sizes.

The resonators have a thickness that is selected to reflect waves with sufficient energy and life times to resonate in the fracture layer and pulverize the fracture material. Consequently, the fracture material is selected to generate wave energy of a desired frequency and the resonators are designed to resonate at that frequency. Thus, the design of the fracture layer generally includes selecting a proper fracture material to generate the desired wave frequency and properly configuring the resonator to sustain that wave energy (thereby causing enhanced fracturing).

There exists a relationship between the frequency of the waves being resonated and the size of the fractured particles. In general, higher energy waves can cause finer fracturing of the fracture material. The frequency of wave that can fracture the brittle material to the desired particle sizes is typically greater than 100 MHz, more preferably 1 GHz, even more preferably, more than 10 GHz.

However, higher frequency phonons are also shorter lived. The attenuation coefficient of a phonon is proportional to the square of the frequency ($\alpha=\alpha_o v2$). The corresponding intensity loss over distance x is: $I=I_o e-\alpha x$. Since the coefficient is dependent on the square of the frequency and the intensity loss is a power of the attenuation coefficient, phonon lifetimes can be very small for high frequencies. For example, a phonon lifetime for a phonon at 10 THz is ~1 ps. Such phonons are so short lived that it can be difficult to resonate such particles over a reasonable distance of the fracture material. Thus, the fracture material can be selected to produce waves having a frequency less than 1 THz, more preferably less than 100 GHz and most preferably less than 50 GHz.

Moreover, the density of states for most solids drops dramatically below 1 meV (v~1 THz). Thus, energy decaying from higher energy states tends to form acoustic spectral lines with energy states concentrated in well-defined narrow energy bands (e.g., in the 1-100 GHz range). These acoustic spectral lines are the result of the composition of the fracture material, which forbids broad based energy transfers across the 1-100 GHz range. Thus, when designing resonators, targeting an acoustic spectral line in the 1-100 GHz range can be advantageous because the resonators can pump a more concentrated energy band and thus cause a more intense fracturing, while minimizing the number of resonators needed.

The resonating high energy waves have a reduced probability of decaying into lower energy waves. Thus, a substantial portion of the decaying ultra-high energy waves are pumped at the desired acoustic spectral line frequency until they are dissipated by fracturing the fracture material into the desired small particles.

For many materials, the acoustic spectral lines in the 100 MHz-100 GHz are known. For example, soda-lime glass has acoustic spectral lines at 450 MHz, 14 GHz, and 24 GHz. However, those skilled in the art will recognize that the acoustic spectral lines for any suitable material can be determined using Brillouin spectroscopy and/or using calculations known in the art.

Fracture materials that have acoustic spectral lines in the 100 MHz-100 GHz range (and in particular the 1 GHz-50 GHz range) include amorphous materials such as glasses or crystalline materials with asymmetry, such as non-cubic crystalline materials. Table 1 below provides a list of example glass-based fracture materials and a high energy spectral line associated therewith. However, the invention is not limited to the materials listed in Table 1.

TABLE 1

| Material | Sound Velocity (km/s) | | f (GHz) |
|---|---|---|---|
| | $C_T$ | $C_L$ | |
| $SiO_2$ (vitreous quartz) | 3.79 | 5.92 | 34.7 |
| Borosilicate crown (wt. %: 71 $SiO_2$, 14 $B_2O_3$, 10 $Na_2O$, 5 $Al_2O_3$) | 3.29 | 5.49 | 33.2 |
| Borosilicate crown (wt. %: 69.6 $SiO_2$, 9.9 $B_2O_3$, 8.4 $Na_2O$, 8.4 $K_2O$, 2.5 BaO) | 3.65 | 6.05 | 37.0 |
| Silicate glass undoped (mol %: 60 $SiO_2$, 27.5 $Li_2O_3$, 10 CaO, 2.5 $Al_2O_3$) | 3.83 | 6.59 | 41.1 |
| Alkali-lead-silicate glass (wt %: 27.5 $SiO_2$, 1.5 $K_2O$, 71.0 PbO | . . . | 3.49 | 25.8 |
| Dense lanthanum flint | 3.56 | 5.55 | 43.0 |
| Tantalum flint | 3.21 | 5.99 | 43.7 |
| Doped Phosphate glass with 0.3 wt % Nd | 3.12 | 5.40 | 33.5 |
| Doped Phosphate glass with 4.8 wt % $Nd2O_3$ | 3.13 | 5.49 | 33.9 |

TABLE 1-continued

| Material | Sound Velocity (km/s) | | f (GHz) |
|---|---|---|---|
| | $C_T$ | $C_L$ | |
| Doped fluorophophate glass (mol %: 16% $Al(PO_3)_3$, 50% LiF, 33% NaF, 1% $Nd_2O_3$) | 2.99 | 5.34 | 31.7 |

The fracture material is also selected to have a low fracture toughness and high surface energy, which will maximize fracture absorption energy, typically at the expense of impact resistance. Typically, a lower fracture threshold will give better energy absorption and less momentum transfer to the armor plate supporting structure. For example regular soda-lime or borosilicate glasses work better than tempered glass for this application. The fracture material is also selected for its ability to absorb high energy compression waves that will degrade into the phonons of the desired acoustic spectral line. One example of a suitable material that can be used as the fracture material is glass. As used herein, the term "glass" is broadly intended to cover amorphous glass, soda glass, transparent silicates, alumina silicate, lithium alumina silicate, borosilicate glass, alkali-lead-silicate, flints, phosphate glasses, cordierite glasses, fluorophosphates glass, doped glasses, combinations of the foregoing, and other known glasses. Other materials can also be used, including but not limited to brittle polymeric materials. For example, polymers having a elongation at break of less than 5% are brittle polymeric materials that can be used. The fracture material 176 may also be non-transparent. Examples of nontransparent materials include nontransparent silicates. Within a given glass type, absorbed fracture energy can be manipulated, if needed, by tempering the glass.

Upon being fractured, the fracture material will form particles that have a particle size that correlates with the acoustic spectral lines of the material. Surprisingly, it has been found that the diameter of the fractured particles (caused by a ballistic impact) can have particle sizes that are similar to the wavelength of the acoustic spectral line energy. The wavelength of the acoustic spectral line can be determined using the equation $\lambda_i=C_i/v_o$ where $\lambda_i$ is the wavelength in the fracture material, $C_i$ is the speed of sound in the material, and $v_o$ is the frequency of the acoustic spectral line. For amorphous materials or crystalline materials with submicron grain sizes, there may be two speeds of sound: longitudinal ($C_L$) and transversal ($C_T$). Table 2 below shows experimental peaks of a distribution of particles from a soda-lime glass that was fractured by ballistic impact. The soda glass has acoustic spectral lines at 0.45 GHz, 14 GHz and 24 GHz and a longitudinal sound velocity of 5100 m/s and a transversal sound velocity of 3200 m/s. The second line of Table 2 shows the calculated wavelength of the acoustic spectral lines for both longitudinal and transversal sound velocities. The third row of Table 2 shows the peaks of the particle size distribution of the fractured glass as measured using laser diffraction.

TABLE 2

| | $v$, (GHz) | | | | | |
|---|---|---|---|---|---|---|
| | 24 | | 14 | | 0.45 | |
| Calculated $\lambda$, (nm) | 133 [$C_L$] | 213 [$C_T$] | 228 [$C_L$] | 365 [$C_T$] | 7060 [$C_L$] | 11400 [$C_T$] |

TABLE 2-continued

| | | v, (GHz) | | | |
|---|---|---|---|---|---|
| | 24 | | 14 | | 0.45 |
| Experimental Peaks (nm) | 129 | 222 | 222 | 379 | 7000 | 11000 |

As shown in Table 2, the experimentally determined peaks of the particle sizes of the fractured material are strikingly similar to the calculated wavelength of the acoustic spectral lines. This demonstrates that wave pressure at the acoustic spectral lines in the 100 MHz to 100 GHz range can fracture the material.

Because smaller fracture sizes result in increased energy absorption, it is generally desirable to cause fracturing by acoustic spectral lines with smaller wavelengths (i.e., higher frequencies). For example, more energy is dissipated by particles fractured by energy at the 24 GHz spectral line than the 450 MHz spectral line. However, depending on the cost and/or design of the resonator, it may be more desirable to target acoustic spectral lines with somewhat shorter wavelengths.

Figure 7:
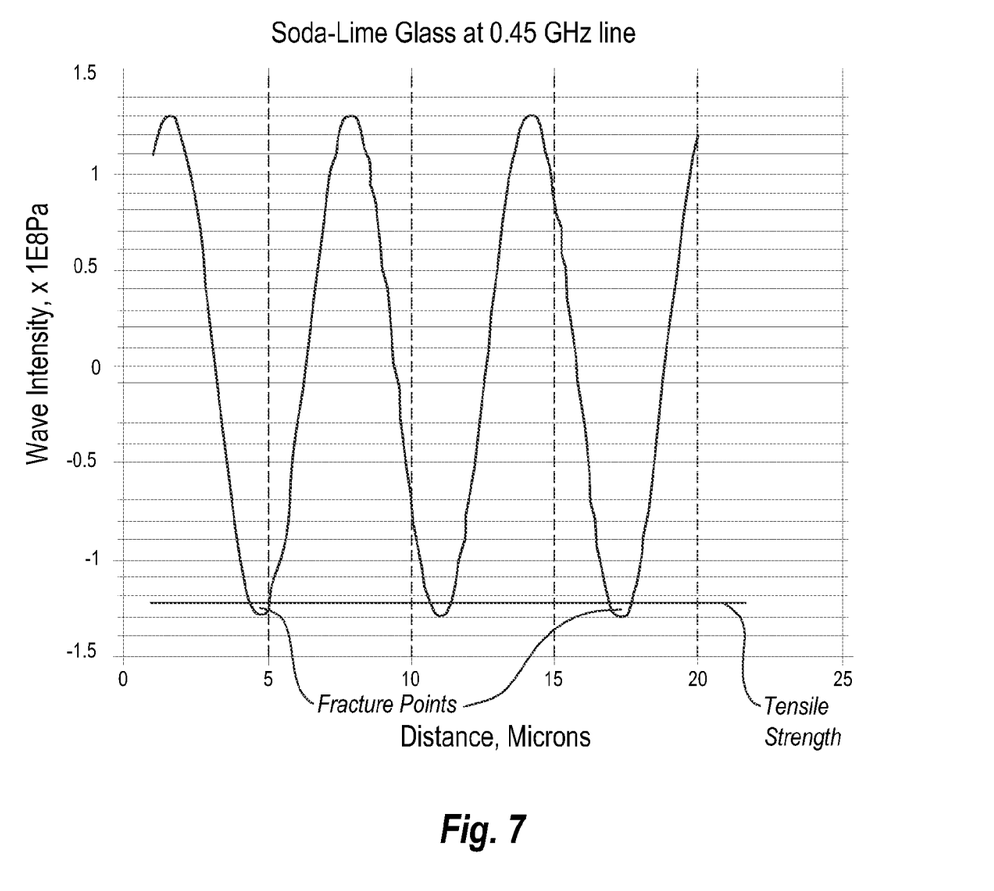
FIG. 7 illustrates a pressure sine wave at the 0.45 GHz spectral line of soda-lime glass.

After selecting the particular fracture material and determining the frequency (i.e., the wavelength) of the acoustic spectral line to be targeted, the resonator can be designed and/or selected to sustain the acoustic spectral line intensity. Where mode dissipation in a resonator is smaller, the mode lives longer before it decays into lower frequency modes, thereby pumping energy into the desired acoustic spectral line of the surrounding material. When the amplitude of the acoustic spectral line pressure reaches the tensile strength of the fracture material, the fracture material will yield and fracture. The effects of amplitude are illustrated in FIG. 7, which show the 0.45 GHz spectral line of soda-lime glass. FIG. 7 shows the peaks reaching an amplitude (120 MPa) that can fracture glass within a period on the order of the wavelength.

The frequency of the acoustic spectral line may be used to determine the thickness of the resonators. The thickness of the resonators (i.e., the distance between the reflecting surfaces of the resonator) may be a distance L defined by the formula: $L = n\lambda/2$, where n is an integer greater than or equal to one and $\lambda$ is the wavelength of the acoustic spectral line in the resonator material.

The wavelength of the acoustic spectral line in the resonator may be different than the wavelength in the fracture material. However, the frequency is generally the same. Moreover, the wavelength can be calculated, as mentioned above, using the equation $\lambda_i = C_i/v_o$, where $v_o$ is the frequency of the acoustic spectral line in the resonator material and $C_i$ is the speed of sound in the resonator material.

The desired thickness of the resonator is defined by the longitudinal modes. As is known in the art of resonance, resonant longitudinal modes are separated by frequency, where $\Delta v = C/2\pi L$ or length $\Delta\lambda = \lambda^2/2\pi L$. For a broadband resonator, L should be as small as possible. In one embodiment, n is no greater than 4, no greater than 3, no greater than 2, and most preferably n is 1. In most cases, achieving a resonator with a thickness that is exactly the same as the calculated thickness based on wavelength (i.e., $n\lambda/2$) of the spectral line may be difficult. However, in the distribution of particles not all the particles must be at the desired thickness for the fracturing effect to be achieved.

For purposes of this invention, determining whether a distribution of particulate resonators has the desired particle size, the distribution of particulate resonators should include at least 5 mass % within a quarter wavelength at the spectral line frequency. Preferably at least 25 mass %, more preferably at least 50 mass % and most preferably at least 75 mass % of the distribution of resonator particles have a size that is less than $\lambda/4$ from the $n\lambda/2$ of the spectral line energy in the resonator material. Generally good levels of resonance can be achieved where at least 25%, preferably at least 50%, or at least 75% by mass of the resonators have a diameter that is less than $\lambda/4$, preferably less than $\lambda/7$, and most preferably less than $\lambda/10$ from the $n\lambda/2$ of the spectral line energy (i.e., the diameter of the desired percentage of particles of the particle distribution deviates no more than $\lambda/4$, etc. in the dimension targeting the desired $\lambda$).

The resonator material is selected to be a different material than the fracture material. In one embodiment, the resonator material is tougher or has a higher tensile strength than the fracture material to prevent high energy waves from fracturing the resonator. The resonators may be transparent or non-transparent. Examples of suitable materials for the resonators include, but are not limited to refractory oxides, carbides, nitrides, or borides. Specific examples include, but are not limited to Al2O3, TiO2, ZrO2, MgO, AlN, TiN, ZrN, Si3N4, BN, SiC, TiC, WC, TiC, ZrC, TiB2, diamond and the like, and combinations of these.

With reference again to FIG. 2, the resonator layers 172 can have a thickness 174 that is $n\lambda/2$, where n is 1, 2, 3 or 4. The thickness of fracture material layers 170 can be any thickness, although in a preferred embodiment, fracture material layers 170 also have a thickness of $n\lambda/2$.

The thickness of fracture material layers 170 is preferably thicker than the thickness of resonator layers 172, such that the percentage of resonator material within the fracture layer is substantially less than the percentage of fracture material. In one embodiment, the weight percent of resonator material in fracture layer 114*a* is less than 10 wt %, more preferably less than 5 wt %, and most preferably less than 1 wt %. The fracture layer can have any number of alternating fracture material layers 170 and resonator layers 172 to achieve a desired thickness and potential for energy dissipation.

As discussed above, the resonators can be a particulate dispersed in the fracture material. FIG. 3 shows spheroidal particles 178*a* dispersed in a fracture material 176 and FIG. 4 shows fiber particulates 178*b* dispersed in fracture material 176 (collectively particulates are referred to as "particulate resonators 178"). The particulate resonators 178 typically have a thickness, which can correspond to the diameter, of about $n\lambda/2$. The particulate resonators 178 do not have to have all their surfaces at a distance of $n\lambda/2$, so long as the distance between at least two reflecting surfaces of the particulate resonators is about $n\lambda/2$.

Particulate resonators 178 can be tubular, rectangular, spheroidal, multi-faceted, and/or regularly or irregularly shaped. Spheroidal particulate resonators include particles that are generally globular in shape (e.g., the length and the width of the particles differ by less than a factor of 1.5). The particulate resonators can be nanoparticles, nanofibers, and/or similar structures made from material including, but not limited to, Al2O3, TiO2, ZrO2, MgO, AlN, TiN, ZrN, Si3N4, BN, SiC, TiC, WC, TiC, ZrC, TiB2, and the like, and combinations of these.

The size of the particulate resonators 178 (in the dimension corresponding to $\lambda$) may be in a range from 5 nm to 100 microns, preferably 10 nm to 50 microns, more preferably 20 nm to 10 microns, and most preferably 40 nm to 1000 nm.

The concentration of the particulate resonators 178 in the fracture layer is selected to maximize resonance and energy dissipation while minimizing cost. As the number of particulate resonators in the fracture material increases, the energy dissipation generally increases. However, as the concentration of particulate resonators increases, the amount of fracture material and the probability that a resonator will be exposed to the proper wavelength of energy decreases. Thus, there can be a diminishing return on increasing the concentration of particulate resonators beyond a certain point. In one embodiment, the concentration of the particulate resonators in the fracture material can be in a range from 0.001 vol % to 10 vol %, more specifically 0.015 vol % to 5 vol %, and even more specifically from 0.01 vol % to 1.0 vol %.

The present invention also relates to methods for making armor plates that include a fracture layer including resonators. In one embodiment the method includes selecting a suitable fracture material having a spectrum line in a range from 100 MHz-100 GHz, preferably 1 GHz-50 GHz and forming a melt of the fracture material. The melt may be formed by heating the fracture material to a temperature that allows the fracture material to be mixed with a plurality of particulate resonators. The particulate resonators may be any of the particle shapes described herein.

The particulate resonators can be incorporated by mixing or blending and may optionally include the use of a solvent such as water or an organic solvent. Organic solvents can be used to incorporate a resonator into a brittle polymeric fracture material.

In one embodiment, the particulate resonators may be dispersed in the melt and then the melt is allowed and/or caused to harden. For example, where amorphous glass is used as the fracture material, the molten glass may be mixed with a metallic particulate resonators and then quenched to cool to a temperature below the glass transition temperature. To prevent melting of the particulate resonators, in one embodiment the particulate resonators can have a melt temperature that is higher than the melt temperature of the fracture material.

The fracture layers manufactured according to this embodiment can be joined to the ceramic layer and/or other layers according to methods known in the art and/or described herein. For example, the fracture layer 114 may be joined to the ceramic layer 112 using curable resins, heat, adhesives, pressure and/or mechanical connection. In an alternative embodiment, the fracture material having the particulate resonators dispersed therein can be applied to the ceramic layer while the fracture material is still in a molten state. For example, the molten material can be poured, molded, injected or extruded onto or with the ceramic layer. The fracture layer can then be allowed to cool.

Figure 8:
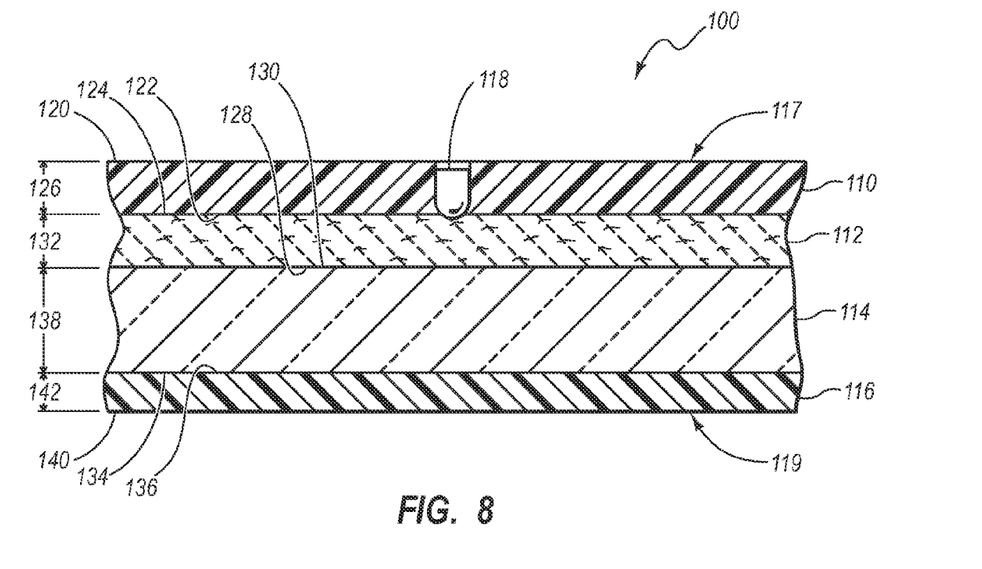
FIG. 8 illustrates the armor plate of FIG. 1 showing the projectile after impact.

FIG. 8 illustrates how armor plate 100 dissipates momentum from projectile 118. FIG. 8 shows projectile 118 penetrating front surface 117 of armor plate 100. At the initial phase of a ballistic impact deformable layer 110 deforms, creating the equivalent of local compression. The compression wave then spreads out at a velocity close to the speed of sound in ceramic layer 112. As projectile 118 moves through ceramic layer 112 it generates a lattice wave by moving dislocations, thereby transforming an additional portion of the projectile energy into acoustic waves. The intensity ratio of the compression wave to the lattice waves generated by moving dislocations depends on the thickness of the deformable layer 110 and ceramic layer 112 relative to the projectile diameter and the properties of the materials used for deformable layer 110 and ceramic layer 112.

One approach taken in making body armor relies on the theory that moving dislocations can last for a relatively long time, thereby spreading total wave generation over time and making the impact less intense. In reality this scenario is difficult to achieve, as deformation needed to absorb significant energy typically is outside of acceptable armor plate thickness for most applications. Hard ceramic plates efficiently convert impact energy into the compression wave. This compression wave fractures a portion of the ceramic, absorbing energy. High impact strength of the ceramics results in the energy absorption in a fixed volume. As a result, thin ceramics do not work well. Also, only a strong wave can fracture ceramics. Lower intensity waves go unaffected, contributing to the momentum transfer to the substrate, which is especially undesirable for a wearable armor.

In contrast, the proposed invention takes a counterintuitive approach. Armor plate 100 can include a soft material in front of ceramic layer 112 (i.e., deformable layer 110). Instead of mitigating a shock wave, deformable layer 110 and ceramic layer 112 are amplifying the shock wave. As a projectile moves through deformable layer 110, pressure on ceramic layer 112 builds up, effectively accumulating the compression wave. Lattice wave generation also lasts longer.

The speed of sound in deformable layer 110 may be selected to be relatively small. When the compression wave reaches ceramic layer 112, for example sapphire, it accelerates to the speed of sound (e.g., from 3 km/s to 11 km/s), thus becoming more intense. The compression wave also spreads out. When the compression waves hits the fracture layer 114 it is close in intensity to the impact point, but can be spread out over an area two orders of magnitude larger than the projectile cross-section area.

When the compression wave strikes the fracture layer 114, acoustic spectral line energy is generated and sustained to cause fine particles to be created and energy dissipated as discussed above.

With reference now to FIG. 8, deformable layer 110, ceramic layer 112, fracture layer 114, and spall liner 116 can be joined together to form armor plate 100 using any technique known in the art. In one embodiment, the layers of armor plate 100 are joined together using curable resins, heat, adhesives, and/or pressure. Preferably, the layers are secured to each other such that armor plate 100 is at least translucent and preferably transparent. In one embodiment transmission values of light in the visible spectrum is at least about 70%, more preferably at least about 80%, and even more preferably at least about 90%.

Figure 9:
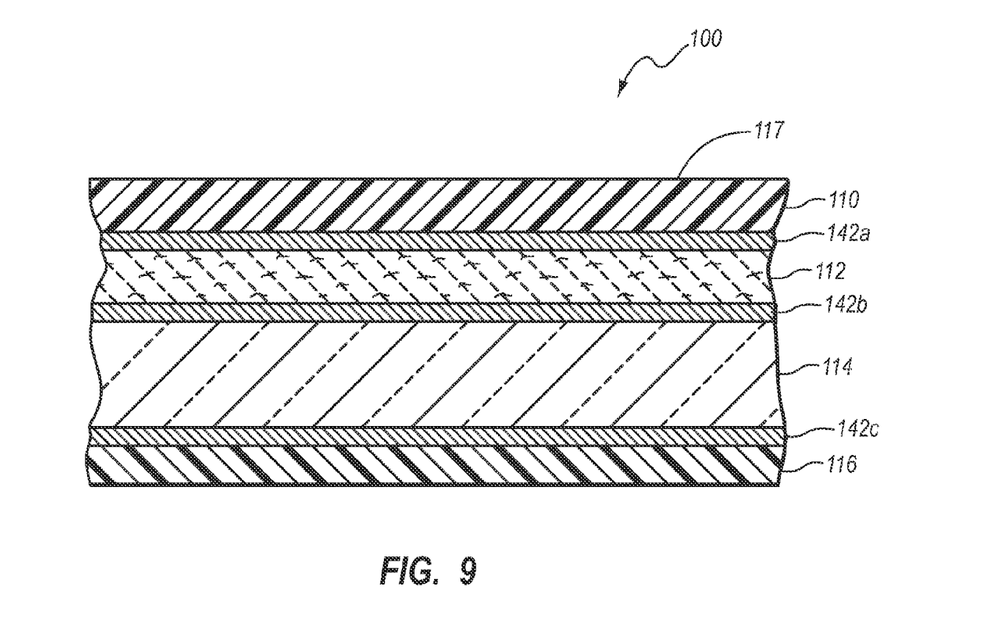
FIG. 9 illustrates an armor plate with adjacent layers of material joined using an adhesive.

FIG. 9 illustrates an example embodiment of armor plate 100 where deformable layer 110, ceramic layer 112, fracture layer 114, and spall liner 116 are joined together by a plurality of intermediate layers such as adhesive layers 142a, 142b, and 142c. Adhesive layers 142a, 142b, and 142c can be made from any material compatible with deformable layer 110, ceramic layer 112, fracture layer 114, and/or spall liner 116. Examples of suitable materials include polymers or resins such as, but not limited to, polyvinyl butyral, cyanoacrylates, epoxies, polyurethanes, acrylics, and combinations of these. The adhesives may be transparent or nontransparent. Other intermediate layers can also be applied. In one embodiment intermediate layers such as, but not limited to adhesive layers 142, may have a thickness less than 10 mm, more specifically less than about 2 mm, more specifically less than about 1 mm, or even less than 100μ. If present, the intermediate layers have a thickness that does not prevent a compression wave from traveling between deformable layer 110, ceramic layer 112, and/or fracture layer 114. For many materials, a thickness less than 2 mm more preferably less than 1 mm can be used.

The layers of armor plate 100 can also be held together in parallel using means other than an adhesive. For example, armor plate 100 can have deformable layer 110, ceramic layer 112, and/or fracture layer 114 in free contact with one another, but clamped together using a frame or other clamping mechanism. A frame or other substrate, such as those illustrated in the devices shown in FIGS. 10-13, can apply a positive force on armor plate 110 to clamp or otherwise secured the layers together.

The overall thickness of armor plate 100 will typically depend on the amount of protection desired. Armor plates for preventing the penetration of high momentum projectiles may be of greater thickness than those for preventing the penetration of lower momentum projectiles, but with increased weight. In one embodiment the combined thickness of the deformable layer, ceramic layer, fracture layer, and spall liner have a thickness of less than 50 mm, more preferably less than 25 mm, even more preferably less than 20 mm, and most preferably less than 15 mm. In an alternative embodiment, the deformable layer, the ceramic layer, the fracture layer, and the spall liner have a combined thickness in a range from about 4 mm to about 25 mm, more preferably from about 5 mm to about 20 mm, and most preferably about 6 mm to about 15 mm. The combined thickness can be approximately the same or thinner than the projectile size. For example the thickness can be 12.7 mm or less.

In some embodiments it may be desirable to make armor plate 100 as thin and as light as possible while achieving a desired level of protection from projectile impact. To achieve a desired thinness, it can be advantageous to make armor plate 100 with only four layers (i.e., deformable layer, ceramic layer, fracture layer, and spall liner) and optionally an adhesive between one or more of the layers and/or a surface coating for modifying optical transmissions (e.g., a tint).

In one embodiment, armor plate 100 may include additional layers on front surface 117 and/or back surface 119. For example, armor plate 100 may include coatings that modify the color and/or light transmission through armor plate 100. In one embodiment a tint coating may be applied to armor plate 100. For example, a tint coating may be desirable for an armor plate used as a window to reduce the amount of light entering through the window and/or to inhibit people on an outside of the window to see inside.

To form armor plate 100, the layers of armor plate 100 can be temporarily fastened together, for example, with tape, and then placed in an autoclave, optionally under vacuum. The armor plate 100 may be pressurized and/or heated. Pressures that may be used include atmospheric, greater than atmospheric, greater than 2 bar, greater than 4 bar or greater than 8 bar. In some embodiments, pressure may be applied in a pressure chamber or by mechanical means, for instance, rollers or a press. Pressure and heat may be applied until the adhesive layers 142 (e.g., PVB) reach a softening point, allowing air bubbles to be expelled and allowing the adhesive to clarify and flow.

The softening temperature of adhesives layers 142 may be, for example, greater than 70° C., greater than 100° C., greater than 150° C., greater than 200° C., or greater than 250° C. In some embodiments the optimum temperature will depend on the pressure applied and the specific adhesive material used to bind the layers. In an alternative embodiment adhesive layers 142 can be polymerized to join the layers of armor plate 100.

Figure 10:
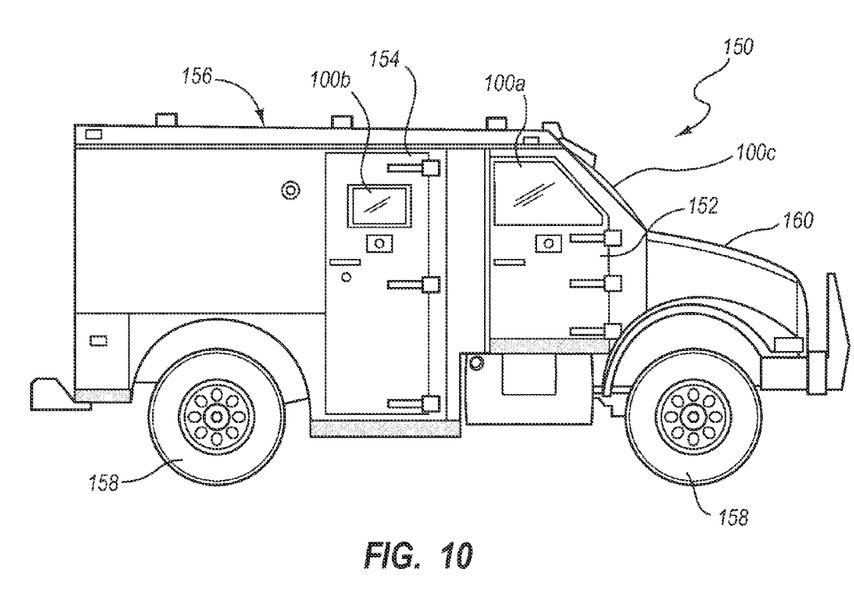
FIG. 10 illustrates an armored vehicle according to one embodiment of the invention incorporating the inventive armor plate.

After hardening, cooling, and/or polymerizing, the layers of armor plate 100 are securely immobilized in relation to each other and may be mounted in a substrate. FIGS. 10-13 illustrate example supporting structures that armor plate 100 can be incorporated into. FIG. 10 shows an armored vehicle 150 having a first armor plate 100a, a second armor plate 100b, and a third armor plate 103 which function as windows on vehicle 150. Armor plates 100a and 100b are mounted in doors 152 and 154, respectively of a body 156. Armor plate 100c functions as a front window. Body 156 provides a protective enclosure within its interior. Armor plates 100a and 100b may be transparent so as to allow personnel in the interior of body 156 the ability to view the surroundings exterior to body 156. Body 156 may be made from an armored material, which is typically opaque. Armored vehicle 150 can include wheels 158 an engine cabin 160 and other features typical of vehicles for providing locomotion (e.g., engine and drivetrain). Armored vehicle 150 can be of any type known in the art, including but not limited to, cars, trucks, boats, airplanes, trains, and the like.

Figure 11:
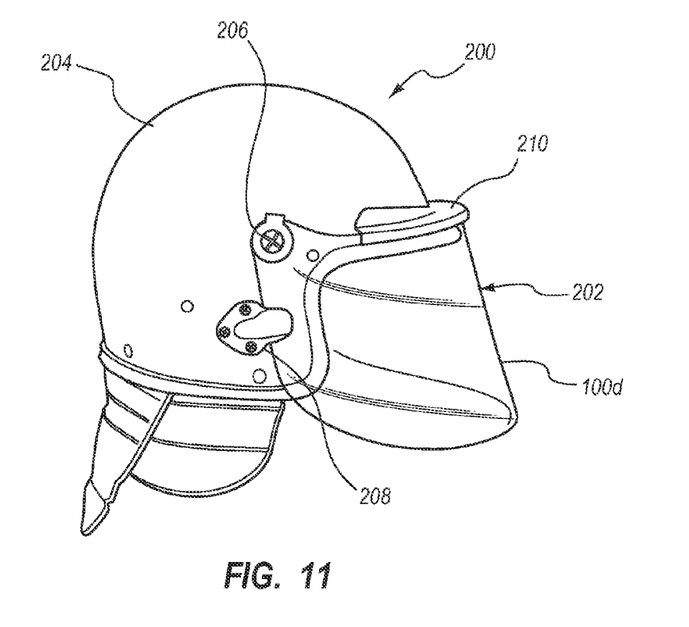
FIG. 11 illustrates a helmet according to an alternative embodiment of the invention incorporating the inventive armor plate.

FIG. 11 illustrates a helmet 200 that incorporates an armor plate 100d according to the present invention. Armor plate 100d is incorporated into a visor 202 having a curved surface secured to a helmet structure 204 through a pair of fasteners 206 on opposing sides of helmet structure 204. Visor 202 functions as a transparent face shield. Helmet 200 may include one or more brackets 208 and 210 to support visor 202. Visor 202 is preferably transparent so as to allow a person wearing helmet 200 to view their surroundings.

Armor plate 100 is particularly advantageous when used in articles that are worn on the head of a person. The use of fracture layer 114 (FIGS. 8 and 9) and armor plate 100 allows substantial percentages of the momentum of a bullet or other object to be absorbed into fracture layer 114 without transferring momentum to be supporting structures such as helmet structure 204. This protects the wearer from injuries that can be caused by rapid acceleration of helmet 200.

Figure 12:
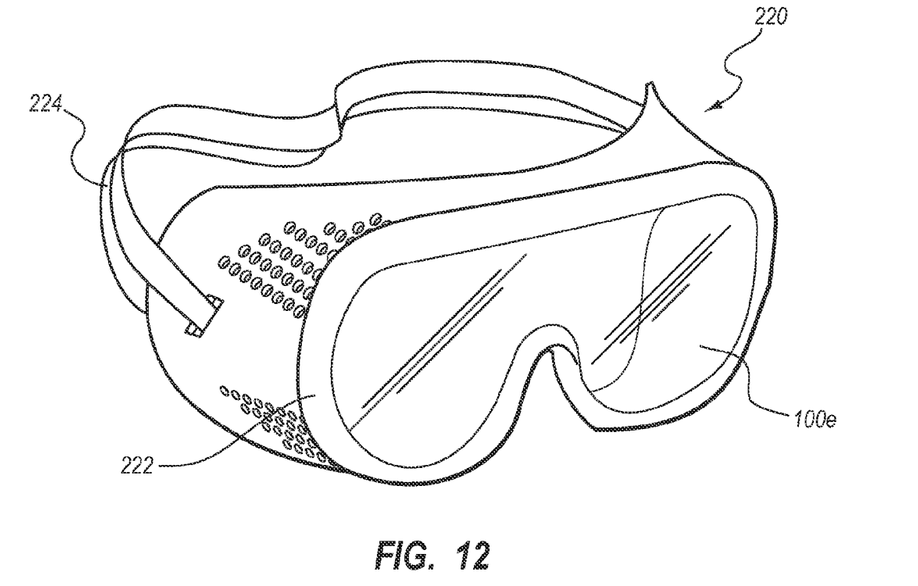
FIG. 12 illustrates a pair of goggles incorporating the inventive armor plate.

FIG. 12 illustrates yet another embodiment of a device that can incorporate armor plate 100. FIG. 12 shows goggles 220 having armor plate 100e, which function as a lens. Armor plate 100e is mounted in frame structure 222. Armor plate 100e can be shaped to provide a lens for correcting myopia and/or hyperopia. A strap to 24 allows goggles 220 to be worn on a person's head.

While FIGS. 10-12 illustrate specific examples of devices in which armor plate 100 may be incorporated, those skilled in the art will recognize that armor plate 100 may be incorporated into any structure where a thin, armored, transparent and/or translucent plate is desirable. For example, armor plate 100 may be used in windows of buildings, paneling or walls in or on buildings, including buildings where target shooting is carried out. While the present invention is advantageous for use with devices that need to be armored against artillery threats, the present invention is not limited to these. Armor plate 100 can be used in any application where a projectile could pose a threat (e.g., motorcycle helmets designed to protect against flying debris on a road).

Figure 13:
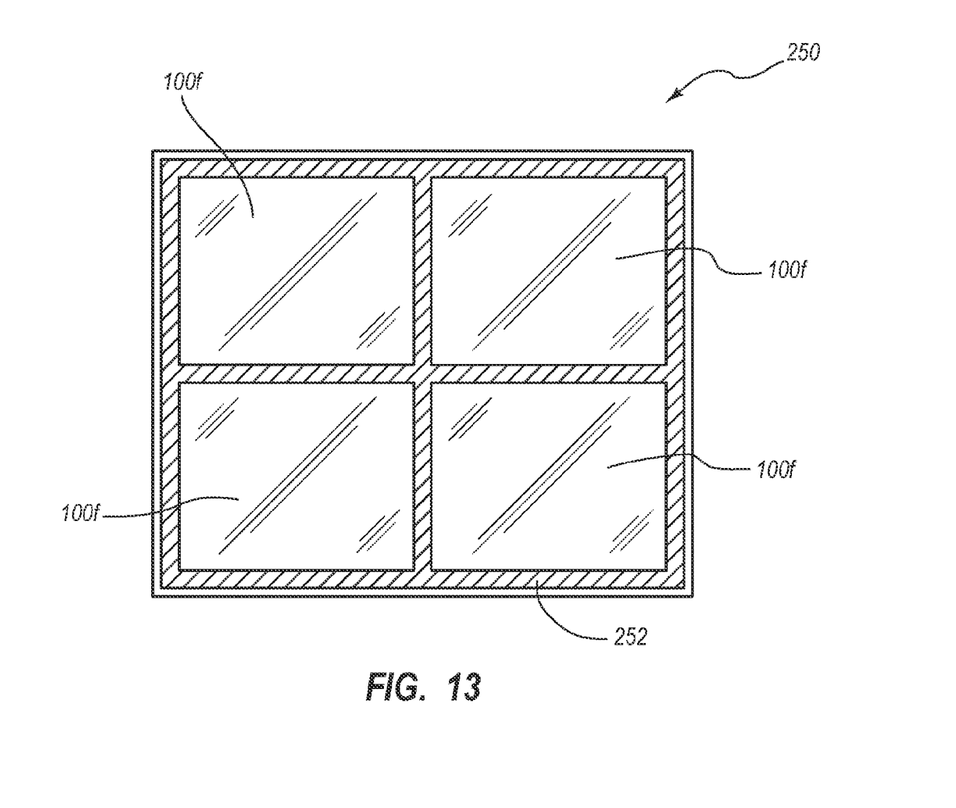
FIG. 13 illustrates a panel including a plurality of segments of the inventive armor plate.

In one embodiment armor plate 100 can be segmented into a panel of armor plates. FIG. 13 illustrates a panel 250 having four segmented armor plates 100f. Segmented armor plates 100f are mounted in a frame structure 252. Segmenting the armor plates reduces crack propagation between portions of the armor plate. In one embodiment, the individual segments are sized to minimize crack propagation between segments while providing a suitable viewing area. Minimizing crack propagation prevents one segment from being compromised by a bullet striking an adjacent segment. In one embodiment this segment can have a surface area in a range from about 1 cm2 to about 30 cm2 with about 3 cm2 to about 10 cm2 being more common. It is also appreciated that panel 250 can comprise a window wherein each armor plate 100f comprises window pane. The window can be mounted on a building or other type of stationary structure. In this context, each armor plate 100f can have a much larger surface area. For example and not by limitation, the surface area of each armor plate 100f can be in the range of 0.2 m2 to about 2 m2 with about 0.4 m2 to about 1 m2 being more common. The window can also be limited to only one armor plate 100*f* or two or more armor plates 100*f*.

Although the above examples primarily illustrate the inventive armor plates being used as transparent armor, it is also appreciated that the present inventive armor can be used in the same manner as conventional armor such as for body armor, helmets, and as panels on vehicles or buildings. The inventive armor also need not be used in a military context but can be used in any commercial product or in any context where it is desired to provide protection or resistance against a projectile of any form.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An armor plate comprising:
   a ceramic layer; and
   a fracture layer secured to the ceramic layer, the fracture layer comprising a fracture material that when subject to a shock wave pumps an acoustic spectral line having a frequency in a range from 100 MHz to 100 GHz, the fracture layer also comprising a plurality of resonators having a thickness and composition that reflects the wave at the frequency.

2. The armor plate as in claim 1, wherein the resonators comprise a plurality of particles dispersed within the fracture material, each of the plurality of particles have a thickness that reflects a wave having the selected spectral line frequency.

3. The armor plate as in claim 2, wherein the particulate resonators are spheroidal particles, fibers, or a combination thereof.

4. The armor plate as in claim 2, wherein the particles have a thickness in a range from 5 nm-100 microns.

5. The armor plate as in claim 2, wherein the particles are comprised of a material having a greater tensile strength than the glass.

6. The armor plate as in claim 5, wherein the fracture layer is comprised of glass.

7. An armor plate as in claim 1, wherein the fracture layer comprises:
   a plurality of fracture material layers each comprised of the fracture material; and
   each of the plurality of resonators comprising a resonator layer disposed between adjacent fracture material layers, the thickness of each resonator layer being configured to reflect the wave at the spectral line frequency.

8. An armor plate as in claim 1, wherein the thickness of at least a majority of the resonators is $n*\lambda/2 \pm \lambda/5$ nm, where n is 1, 2, or 3 and $\lambda$ is the wavelength of the phonons in the resonator.

9. An armor plate as in claim 1, wherein the spectral line has a frequency greater than 1 GHz.

10. An armor plate as in claim 9, wherein the thickness of at least a majority of the resonators is $n*\lambda/2 \pm \lambda/10$ nm, where n is 1 or 2 and $\lambda$ is the wavelength of the phonons in the resonator.

11. An armor plate as in claim 1, wherein the fracture material is selected from the group consisting of glass, soda glass, a silicate material, or a combination thereof.

12. An armor plate as in claim 1, wherein the ceramic layer is comprised of sapphire, aluminum oxynitride, spinel, AlN, alumina, silicon carbide, boronitride, boron carbide, diamond, or a combination thereof.

13. An armor plate as in claim 1, wherein the resonators are comprised of $Al_2O_3$, $TiO_2$, $ZrO_2$, MgO, AlN, TiN, ZrN, $Si_3N_4$, BN, SiC, TiC, WC, TiC, ZrC, $TiB_2$, or combinations thereof.

14. An armor plate as in claim 1, wherein the armor plate is transparent.

15. The armor plate as in claim 1, further comprising:
    a deformable layer disposed adjacent to a side of the ceramic layer opposite the fracture layer; and
    a spall liner disposed adjacent to a side of the fracture layer opposite the ceramic layer, the deformable layer being comprised of a material having an elongation before breaking of at least 20%.

16. The armor plate as recited in claim 15, wherein the deformable layer has an elongation before breaking of at least 100%.

17. The armor plate as recited in claim 1, further comprising an adhesive joining the ceramic layer and the fracture layer.

18. A vehicle comprising a body having one or more windows comprised of the armor plate as recited in claim 1, the armor plate being transparent.

19. A helmet comprising a helmet structure and a visor secured to the helmet structure, the visor being comprised of the armor plate as recited in claim 1, the armor plate being transparent.

20. A goggle comprising a frame structure, a strap secured to the frame structure, and one or more lens mounted to the frame structure, the one or more lenses being comprised of the armor plate as recited in claim 1, the armor plate being transparent.

21. A window comprising a window pane encircled by a frame, the window pane being comprised of the armor plate as recited in claim 1, the armor plate being transparent.

22. The armor plate as in claim 1, wherein the fracture layer has an average thickness in a range from 0.5 mm to 10 mm.

* * * * *